3,010,471
VALVE FOR MAGNETIC FLUIDS
William A. Gross, San Jose, Calif., assignor to International Business Machines Corporation, New York, N.Y., a corporation of New York
Filed Dec. 21, 1959, Ser. No. 860,745
3 Claims. (Cl. 137—251)

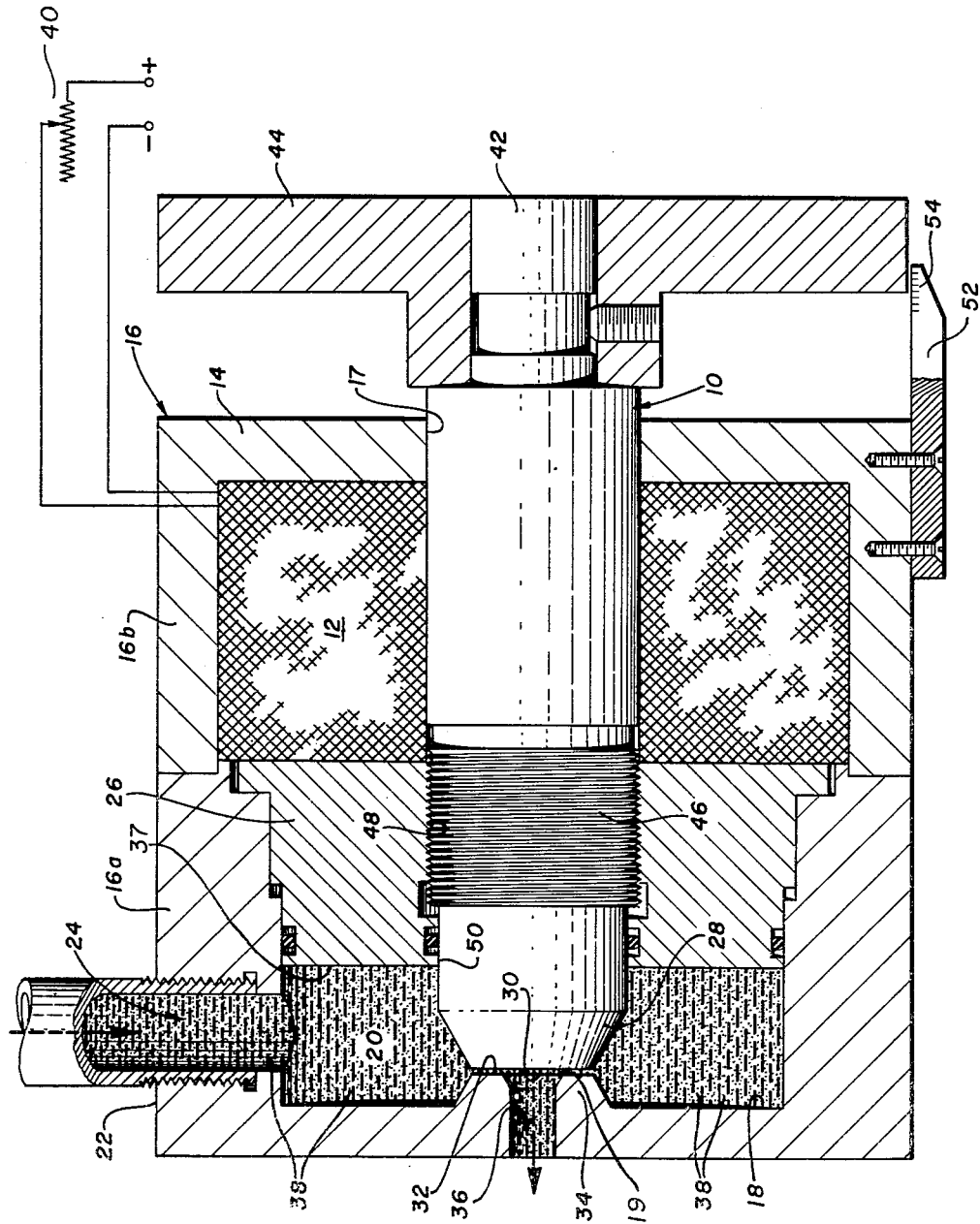

The present invention relates to valves for controlling the flow of fluids. More particularly, the present invention relates to valves for controlling the flow of magnetic fluids, including ferromagnetic fluids, paramagnetic fluids and diamagnetic fluids.

It is an object of this invention to provide a simple yet efficient valve for controlling the flow of magnetic fluids.

It is another object of the invention to provide a device for controlling the flow of magnetic fluids that is immediately responsive and easy to operate.

It is a particular object of the invention to provide a simple, rapidly responsive device for controlling the flow of magnetic fluids by the application of magnetic fields.

An additional object of the invention is to provide a valve for controlling the flow of fluids without the use of physically movable flow control components.

These and other objects of the present invention will be apparent from the following description of the accompanying drawing which illustrates a preferred embodiment thereof and which represents a central vertical section through a fluid control valve embodying my invention.

The control valve of the invention comprises a cylindrical core 10 of a magnetizable material, such as iron, which carries a magnetizing winding 12 and which is concentrically surrounded by a closed pot 16 of magnetizable material that establishes a low reluctance return path for the magnetic force lines set up in the core whenever the magnetizing winding is energized. The pot 16 may be formed by two symmetrically arranged halves 16a and 16b that are suitably joined along their edges as shown in the drawing, and the core 10 is slidably supported in a central aperture 17 provided in the floor or end wall 14 of the right half 16b of the pot. Arranged between the floor 18 on the left pot portion 16a and the core 10 is a narrow gap 19 that constitutes part of a conduit 20 which passes through the left half of the pot 16. For this purpose the side wall 22 of the left pot portion is provided with an inlet indicated at 24, and the space adjacent the floor 18 of pot portion 16a is sealed from the remaining interior of the pot in a fluid-tight manner by a partition of non-magnetic material in the form of a centrally apertured disk of brass 26 through which the inner end 28 of the core 10 protrudes as shown and which may suitably be supported from the side wall 22 of the left pot portion 16a. The inner end 28 of core 10 has the shape of a truncated cone and its end surface 30 is located closely adjacent to the annular end face 32 of a crater-shaped projection or protuberance 34 formed in the center of the floor 18 of the left pot portion 16a. Said crater 34 surrounds a passage 36 that leads from the interior of the pot to the outside.

In practical operation a fluid having magnetic properties may be passed through the passage formed by inlet 24, the space 20 between the floor of the left pot portion 16a and the inner end face 37 of the disk 26, the annular gap 19 and the outlet 36. A ferromagnetic fluid may be formed by forming a suspension of iron filings, indicated at 38 in the drawing, within a suitable carrier liquid. When the electromagnet formed by the winding 12 and the core members 10, 16a and 16b is de-energized, a ferromagnetic fluid, for example, will flow in the normal manner through the described passage since the particles contained therein are too small to obstruct, or be impeded by, the annular passage 19 formed by and between the inner end face 30 of the core 10 and the annular top surface 32 of the crater 34. When the winding 12 is energized, however, and a magnetic field is set up across the gap 19 through which the fluid must pass, the magnetizable particles contained in the fluid orient themselves and conglomerate giving the appearance as if the fluid would thicken and even freeze within, and in the vicinity of, the gap 19. A similar freezing is possible with paramagnetic fluids, but a repulsion results with diamagnetic fluids.

As a result, the free flow of the fluid through the described valve is impeded and slows down to an extent dependent upon the intensity of the magnetic field established by energization of the winding 12, and if the current passed through said winding is sufficiently strong, the annular passage 19 may be completely blocked so that the flow of fluid through the conduit 20 ceases completely. Thus, by controlling the strength of the current passed through the winding, such as by means of a suitable rheostat indicated at 40, the flow of fluid through the valve of the invention may be controlled very accurately and may be stopped entirely if desired. On the other hand, flow of fluid through the valve of the invention may be allowed to recommence and/or to increase in strength by the simple expedient of decreasing the flow of current through the winding 12 or de-energizing the winding entirely. The permeability of a ferromagnetic suspension may be comparable to that of a paramagnetic fluid such as liquid sodium. The same valve will control the flow of paramagnetic and diamagnetic fluids such as liquid oxygen (in which the control is due to the repulsion of the oxygen from the field).

For best performance, I have found that the size of the gap should be properly related to the properties of the magnetic fluid. Thus, for large ferromagnetic particle sizes and/or heavy suspensions it is of advantage to increase the size of the gap 19 to assure that the device of the invention will respond promptly and permit flow of the fluid to recommence, or to increase, whenever current flow through the magnetizing winding 12 is decreased or interrupted. The construction of the valve illustrated in the accompanying drawing is therefore such that the width of the gap 19 in the magnetic structure may be varied at will. For this purpose the cylindrical center core 10 is slidably supported in the central aperture 17 provided in the floor or end wall 14 of the right half 16b of the magnetic pot 16, as has been pointed out hereinbefore, and its outwardly protruding end 42 carries an operating wheel 44; and within the pot structure, said center core is provided with external threads 46 which are engaged with internal threads 48 provided in the surface of the aperture 50 in the brass partition 26 that is supported from the wall 22 of the left pot portion 16a. Thus, by turning the wheel 44 in one or the other direction the gap 19 formed between the inner end surface of the core 10 and the annular top surface of crater 34 may be made narrower or wider to condition the device for optimum performance with different magnetic fluids. To indicate the size of the gap visibly to the person manipulating the setting wheel 44, a suitable rule 52 may be bolted to the outer surface of the right portion 16b of pot 16 and carry suitable calibrations opposite the inner surface of the setting wheel as indicated at 54 in the drawing.

In carrying out the invention in practice in connection with a ferromagnetic fluid composed of a suspension of ten parts by weight of carbonyl iron powder of an average particle size of 1 micron in a one part by weight of a light weight hydrocarbon oil, a gap 19 of a width of 0.1 inch proved to give satisfactory performance, providing quick response both in blocking and in unblocking the valve by appropriate control of the current flow through the energizing winding 12.

The described device makes it possible to control the flow of liquids having magnetic properties very accurately without the use of physically moving flow control components, merely by setting of a suitable current control switch. It is of simple construction, and it may readily be adapted for optimum performance with magnetic fluids of different character and composition.

While I have explained my invention with the aid of a preferred embodiment thereof, it will be understood that the invention is not limited to the specific constructional details shown and described which may be departed from without departing from the scope and spirit of my invention.

I claim:

1. A valve for the control of magnetic fluids comprising a conduit for the flow of the magnetic fluid, a structure of magnetizable material extending into said conduit and establishing a closed magnetic path having an air gap located within said conduit and forming a restricted passage therein, means operable to vary the width of said restricted passage, and means on said structure operable to magnetize said structure and form a magnetic field across said restricted passage.

2. A valve for the control of magnetic fluids comprising a magnetizable structure in the form of a closed pot having end walls, a magnetizable center core extending from one of said end walls axially into a position adjacent to but separated from the opposite end wall to form with said opposite end wall a narrow annular gap, said opposite end wall having an aperture located centrally of said gap, means forming a conduit for the flow of magnetic fluid through said annular gap and said aperture, and a magnetizing winding supported upon said center core within said pot to establish upon energization a magnetic field across said annular gap between the inner end of said center core and the adjacent end wall of said pot.

3. A valve for the control of ferromagnetic fluids comprising a magnetizable structure in the form of a closed pot having centrally apertured end walls, a magnetizable center core slidably supported in the aperture of one of said end walls and extending axially within said pot with its inner end into a position adjacent to but separated from the opposite end wall to form with said opposite end wall a narrow gap around the central aperture thereof, means forming a conduit for the flow of ferromagnetic fluid through said annular gap and the aperture in said opposite end wall, means operable to shift said core axially of said pot to vary the width of said annular gap, and a magnetizing winding supported upon said core within said pot to establish upon energization a magnetic field across said annular gap between the inner end of said center core and the adjacent end wall of said pot.

References Cited in the file of this patent

UNITED STATES PATENTS

| | | |
|---|---|---|
| 2,133,527 | Beckman | Oct. 18, 1938 |
| 2,651,258 | Pierce | Sept. 8, 1953 |